April 14, 1936.　　　A. F. RITCHIE　　　2,037,538
GASOLINE TURBINE MOTOR
Filed March 1, 1935
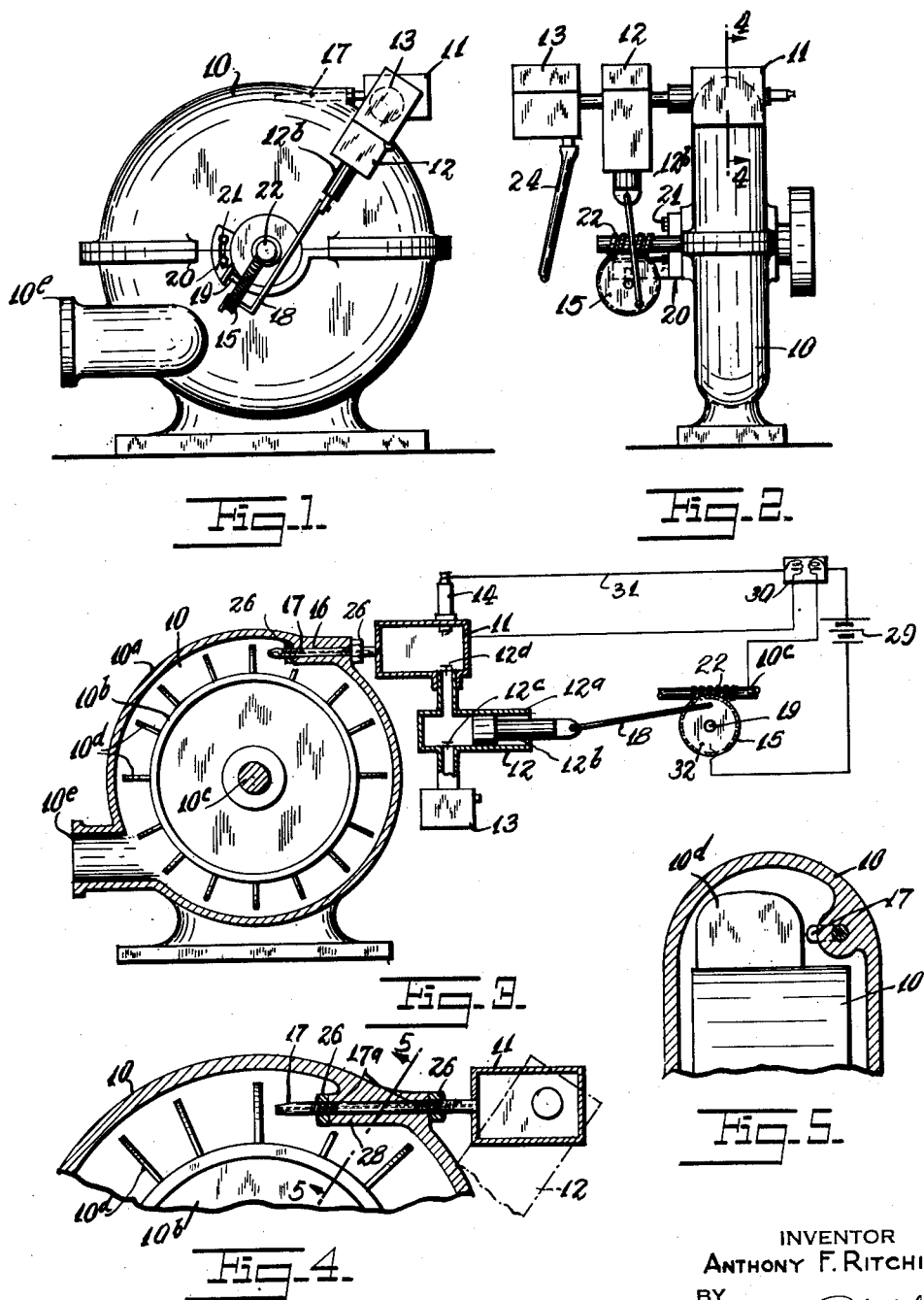
INVENTOR
ANTHONY F. RITCHIE
BY
ATTORNEY Patented Apr. 14, 1936

2,037,538

UNITED STATES PATENT OFFICE 2,037,538

GASOLINE TURBINE MOTOR

Anthony F. Ritchie, Harrington Park, N. J.

Application March 1, 1935, Serial No. 8,814

1 Claim. (Cl. 60—41)

This invention relates to new and useful improvements in a gasoline turbine motor.

The invention has for an object the construction of a device as mentioned which is characterized by a turbine, a gas combustion chamber for supplying gas to drive the turbine, a carburetor for vaporizing liquid gas, a pump for supplying the vaporized gas to the combustion chamber, and a drive for the pump synchronized with an ignition device for igniting the gas in the combustion chamber to supply gases at high velocity to the turbine.

More particularly, the invention contemp'ates the arrangement of the gas pump between the carburetor and the combustion chamber so that the gases may be drawn from the carburetor and discharged into the combustion chamber.

Still further the invention proposes driving the pump direct from the shaft of the turbine.

As another object of this invention it is proposed to include in the ignition system a timing gear associated with the pump so as to properly function to ignite the gases in the chamber.

Still further the invention proposes an arrangement whereby the combustion chamber is mounted on the casing of the turbine and directly connected with the pump and carburetor in such a manner that the pump is arranged radially of the casing of the turbine shaft and driven from a gear at an angle and meshing with a pinion on the shaft.

Furthermore, the invention contemplates a construction whereby the combustion chamber is equipped with a nozzle adapted to discharge against the blades of the rotor of the turbine, and arranged to be adjustable so as to be directed against desired areas of the blades depending upon the desired operation of the turbine.

Another object of the invention is the construction of a device as mentioned which is simple and durable and which can be manufactured and sold at a reasonable cost.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:—

Fig. 1 is a side elevational view of a device constructed according to this invention.

Fig. 2 is an end elevational view looking from the right hand end of Fig. 1.

Fig. 3 is a schematic developed view of the device.

Fig. 4 is a fragmentary sectional view taken on the line 4—4 of Fig. 2.

Fig. 5 is a fragmentary sectional view taken on the line 5—5 of Fig. 4.

The gasoline turbine motor, according to this invention, consists of a gas turbine 10 adapted to be operated by a supply of gas discharged from a combustion chamber 11 receiving its supply by a pump 12 drawing fuel from a carburetor 13. The carburetor is mounted upon one side of the pump 12, and the pump 12 is mounted on one side of the combustion chamber 11. The pump 12 is driven from the shaft of the turbine, as hereinafter further described. The combustion chamber 11 is provided with a spark plug 14 which is operated by a circuit controlled with a timing gear 15 associated with the pump 12.

The turbine 19 essentially consists of a casing 10$^a$ housing a rotative rotor 10$^b$ having a rotor shaft 10$^c$. The casing 10 is furthermore formed with an inlet 16 through which a nozzle 17 from the combustion chamber extends to supply the gases to the blades 10$^d$ of the rotor. The casing 10 is formed with an exhaust 10$^e$ for the discharge of the gases after they have caused the rotor to turn.

The combustion chamber 11 is merely in the form of a receptacle from which the nozzle 17 extends. The pump 12 comprises a cylinder 12$^a$ in which a piston 12$^b$ is slidably mounted. The pump has an intake valve 12$^c$ and is associated with an exhaust valve 12$^d$. The carburetor 13 is connected to the intake side of the pump. The discharge of the pump is connected with the combustion chamber 11. The piston 12$^b$ of the pump is operated by a connecting rod 18 pivotally connected at one end with the piston and at the other end eccentric on the timing gear 15. The timing gear is supported on a stud shaft 19 mounted in a bracket 20 which is adjustably fixed by several cap screws 21 upon the side of the turbine casing 10$^a$. The purpose of adjustably supporting the timing gear is to permit a change of position necessary for changed position of the pump 12 occasioned by an adjustment of the nozzle 17 as hereinafter further described.

The cap screws 21 pass through slightly elongated slots in the bracket 20 so that the position of the bracket may be adjusted as desired. The slots are arcuate relative to the axis of the rotor shaft so that the bracket 20 may be angularly adjusted. The gear 15 is in the form of a worm gear and meshes with a worm pinion 22 fixed on the rotor shaft 10c. Fig. 3 is a schematic view and does not show the correct relation of the parts. Figs. 1 and 2 show the exact location of the various parts. It should be noted that the connecting rod 18 extends upwards at an inclination, between the gear 15 and the piston 12b of the pump. A gasoline supply line 24 connects with the carburetor 13.

The nozzle 17 is adjustably mounted on the casing 10a. It is formed with threaded areas 17a upon which nuts 26 are mounted. These nuts engage against opposite sides of a boss 28 formed upon the turbine casing. The nuts 26 may be loosened when the casing is opened to push the nozzle 17 further inward or outwards. The nozzle 17 extends along the sides of the blades 10d (see Fig. 5) so that it may be extended to any desired position. The advantage of adjusting the nozzle resides in the fact that the rotor is circular, and the nozzle is adjustable in a tangential position, and therefore a change in the position of the nozzle changes the relative radial distance and angle of the gases impinging against the blades of the rotor. This adjustment is valuable when it is desired to tune the turbine to various speeds and to various conditions of operation of the pump 12. If gases of relatively low quantity and low pressure are supplied to the nozzle 17 the turbine will rotate relatively slowly, and when so operated, the nozzle 17 for operating at its greatest efficiency should be at the shortest radial distance from the center of the turbine rotor, because points nearest the center move the slowest. If gases of relatively large quantity and high pressure are supplied to the nozzle 12 the turbine will rotate relatively faster, and when so operated the nozzle 17 for operating at its greatest efficiency should be at the largest radial distance from the center of the turbine rotor because the point furthest from the center moves the fastest. The nozzle 17 cannot be adjusted while the device is operating.

The device is equipped with an ignition circuit consisting of a battery 29, a transformer 30, and a circuit 31 which includes the spark plug 14 and a switch 32. The switch 32 consists of a contact upon the timing gear 15 engageable with a stationary contact to cause operation of the circuit each time these contacts engage each other.

The operation of the device is as follows:—

As the device operates, the pump 12 will draw in gas from the carburetor 13 and force this gas into the combustion chamber 14. Periodically an explosion occurs in the combustion chamber, and since the gases cannot re-enter the pump because of the pump valves, they will discharge through the nozzle 17 against the blades of the rotor and cause the turbine to operate.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:—

A gasoline turbine motor, comprising a gas turbine, a gas combustion chamber for supplying gases to the turbine, a gas supply line, a carburetor for vaporizing a supply of gas, a pump for supplying the vaporized gas to the combustion chamber, a drive for the pump, and an ignition system for periodically igniting the gases in the combustion chamber so that they are supplied under pressure to the turbine, a bracket adjustably mounted on said turbine, a stud projecting from said bracket, a gear rotative on said stud and in a plane radially with the center of the turbine rotor, said drive comprising a connecting rod from a piston of the pump to an eccentric pin on said gear, a nozzle projecting from the gas combustion chamber and tangentially engaging through and adjustable relative to the casing of the turbine to direct gases against the blades of the rotor and to support the gas combustion chamber, and means for holding said nozzle in various adjusted positions, said pump being swivelly connected with said combustion chamber.

ANTHONY F. RITCHIE.